United States Patent
Ueyama et al.

(10) Patent No.: US 11,112,628 B2
(45) Date of Patent: Sep. 7, 2021

(54) LIQUID CRYSTAL DISPLAY DEVICE INCLUDING COMMON ELECTRODE CONTROL CIRCUIT

(71) Applicant: SHARP KABUSHIKI KAISHA, Sakai (JP)

(72) Inventors: Yuta Ueyama, Sakai (JP); Masami Ozaki, Sakai (JP); Hideki Morii, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/609,586

(22) PCT Filed: Jun. 8, 2018

(86) PCT No.: PCT/JP2018/021972
§ 371 (c)(1),
(2) Date: Oct. 30, 2019

(87) PCT Pub. No.: WO2018/230452
PCT Pub. Date: Dec. 20, 2018

(65) Prior Publication Data
US 2020/0150475 A1    May 14, 2020

(30) Foreign Application Priority Data

Jun. 16, 2017 (JP) .............................. JP2017-118260

(51) Int. Cl.
G02F 1/133 (2006.01)
G02F 1/1343 (2006.01)

(52) U.S. Cl.
CPC ...... *G02F 1/13306* (2013.01); *G02F 1/13439* (2013.01); *G02F 2201/121* (2013.01); *G02F 2202/10* (2013.01)

(58) Field of Classification Search
CPC combination set(s) only.
See application file for complete search history.

(56) References Cited

U.S. PATENT DOCUMENTS

2002/0080133 A1* 6/2002 Eu ..................... G09G 3/3648
345/212
2005/0139837 A1* 6/2005 Lee .................. G02F 1/134363
257/72

(Continued)

FOREIGN PATENT DOCUMENTS

JP 2002-207455 A 7/2002
JP 2009-104014 A 5/2009

(Continued)

*Primary Examiner* — Lauren Nguyen
(74) *Attorney, Agent, or Firm* — ScienBiziP, P.C.

(57) ABSTRACT

A charge pull-out period is set after power off, and an all-on control signal is set to a high level in the charge pull-out period. A high-level voltage which is output to a scanning line drive circuit formed on a liquid crystal panel is kept at a high level even after power off until a middle of the charge pull-out period. A common electrode control circuit for connecting a common electrode to a ground when the all-on control signal is at the high level and the high-level voltage is at an operation level is configured using two resistors, a NOT circuit, and two FETs, and is provided to a liquid crystal display device. With this, a liquid crystal display device which can lower a common electrode voltage to a ground level when power off and can prevent burn-in after power on is provided.

5 Claims, 4 Drawing Sheets

(56) References Cited

U.S. PATENT DOCUMENTS

| | | | |
|---|---|---|---|
| 2007/0069386 A1* | 3/2007 | Takahashi | G11C 13/003 |
| | | | 257/758 |
| 2009/0153538 A1 | 6/2009 | Nakatani et al. | |
| 2012/0138922 A1 | 6/2012 | Yamazaki et al. | |
| 2013/0320334 A1 | 12/2013 | Yamazaki et al. | |
| 2013/0321494 A1* | 12/2013 | Takaki | G09G 3/3685 |
| | | | 345/691 |
| 2014/0191935 A1 | 7/2014 | Morii et al. | |
| 2014/0286076 A1 | 9/2014 | Aoki et al. | |
| 2014/0306948 A1 | 10/2014 | Iwamoto et al. | |
| 2015/0206498 A1 | 7/2015 | Miyata et al. | |
| 2016/0204137 A1* | 7/2016 | Wu | H01L 27/1218 |
| | | | 257/43 |

FOREIGN PATENT DOCUMENTS

| | | |
|---|---|---|
| JP | 2012-134475 A | 7/2012 |
| JP | 2014-007399 A | 1/2014 |
| JP | 2014-209727 A | 11/2014 |
| WO | 2013/021930 A1 | 2/2013 |
| WO | 2013/088779 A1 | 6/2013 |
| WO | 2014/050719 A1 | 4/2014 |

* cited by examiner

LIQUID CRYSTAL DISPLAY DEVICE INCLUDING COMMON ELECTRODE CONTROL CIRCUIT

TECHNICAL FIELD

The present invention relates to a display device, especially to a liquid crystal display device and a drive method therefor.

BACKGROUND ART

Liquid crystal display devices are widely used as thin, light-weight, and low power consumption display devices. The liquid crystal display device includes a liquid crystal panel, a scanning line drive circuit, a data line drive circuit, and the like. On the liquid crystal panel, pixel circuits each including a thin film transistor (hereinafter referred to as a TFT) are formed two-dimensionally. The scanning line drive circuit is also called a gate driver.

In many recent liquid crystal display devices, in order to make the device small, a technology (gate driver monolithic technology) in which the scanning line drive circuit is formed on the liquid crystal panel using the TFTs is adopted. The scanning line drive circuit formed on the liquid crystal panel is also called a monolithic gate driver. The liquid crystal panel on which the scanning line drive circuit is formed is also called a gate driver monolithic liquid crystal panel.

Furthermore, in the liquid crystal display devices, in order to reduce power consumption, a technology in which the TFTs included in the liquid crystal panel are formed using oxide semiconductor may be adopted. For example, a technology of forming the TFTs using indium gallium zinc oxide (hereinafter referred to as IGZO) which is one type of oxide semiconductor comes into practical use. Off leakage current of the TFT (hereinafter referred to as an IGZO-TFT) formed using IGZO is much smaller than that of the TFT formed using other materials. Therefore, according to the liquid crystal display device using the IGZO-TFTs, it is possible to reduce off leakage current of the TFT and to reduce power consumption drastically.

As conventional art, Patent Documents 1 and 2 disclose liquid crystal display devices each having a monolithic gate driver formed using the IGZO-TFTs. The liquid crystal display devices disclosed in Patent Documents 1 and 2 perform a predetermined power-off sequence in order to pull out charge remaining in the liquid crystal panel when power off.

PRIOR ART DOCUMENTS

Patent Documents

[Patent Document 1] International Publication No. 2013/21930

[Patent Document 2] International Publication No. 2013/88779

SUMMARY OF THE INVENTION

Problems to be Solved by the Invention

In the liquid crystal display device, a charge pull-out period for pulling out the charge remaining in the liquid crystal panel is set after power off. In the charge pull-out period, all of the scanning lines in the liquid crystal panel are selected collectively. In the charge pull-out period, it is preferable that a common electrode voltage of the liquid crystal panel be lowered to a ground level (0V). This is because if the common electrode voltage is not equal to the ground level after power off, the charge remain in the liquid crystal panel (specifically, on a pixel electrode and a common electrode), and burn-in occurs in the liquid crystal panel when power on again.

FIGS. 4 and 5 are signal waveform diagrams of conventional liquid crystal display devices when power off. In FIG. 4, a power supply voltage VCC changes from 3.3 V to the ground level at time t0. In a charge pull-out period time which is set at time t1 to t2, an all-on control signal ALLON for selecting all of the scanning lines becomes a high level. From a start of the charge pull-out period, a common electrode voltage Vcom starts lowering. However, in the conventional liquid crystal display device, it is impossible to secure enough time for controlling the common electrode voltage Vcom after power off. Thus, in the example shown in FIG. 4, the common electrode voltage Vcom cannot be lowered to the ground level in the charge pull-out period.

In FIG. 5, the common electrode voltage Vcom reaches or approaches to the ground level in the charge pull-out period. After that, the common electrode voltage Vcom gets higher in a short time, and then gets lower slowly. Thus, also in the example shown in FIG. 5, the common electrode voltage Vcom cannot be lowered to the ground level in the charge pull-out period.

Especially in the liquid crystal display device using the IGZO-TFTs, since the off leakage current of the TFT is small, the charge remaining in the liquid crystal panel when power off remains undischarged for a long time. Thus, burn-in is likely to occur in the liquid crystal panel when power on again.

Even in the liquid crystal display devices described in Patent Documents 1 and 2, since a power supply voltage supplied from a power supply control circuit turns off before the charge pull-out period, it is difficult to lower a voltage of a common electrode to the ground level in the charge pull-out period.

Therefore, providing a liquid crystal display device which can lower a common electrode voltage to a ground level when power off and can prevent burn-in after power on is taken as a problem.

Means for Solving the Problems

The above problem can be solved, for example, by a liquid crystal display device including: a liquid crystal panel having a common electrode and formed using oxide semiconductor; a power supply control circuit configured to output a control signal which becomes an active level in a period set after power off, and a power supply voltage which is kept at an operation level even after power off until a middle of the period; and a common electrode control circuit configured to connect the common electrode to a ground when the control signal is at the active level and the power supply voltage is at the operation level.

The above problem can be also solved by a drive method for a liquid crystal display device including a liquid crystal panel having a common electrode and formed using oxide semiconductor, the method including steps of: setting a control signal to an active level in a period set after power off; keeping a power supply voltage at an operation level even after power off until a middle of the period; and connecting the common electrode to a ground when the control signal is at the active level and the power supply voltage is at the operation level.

Effects of the Invention

According to the above-described liquid crystal display device and drive method therefor, in a part of the period set after power off, the control signal becomes the active level, the power supply voltage becomes the operation level, and the common electrode is connected to the ground. Thus, a common electrode voltage is lowered rapidly after a start of the period and reaches the ground level in a short time. Therefore, it is possible to prevent charge from remaining in the liquid crystal panel after power off and to prevent burn-in after power on.

MODES FOR CARRYING OUT THE INVENTION

Figure 1:
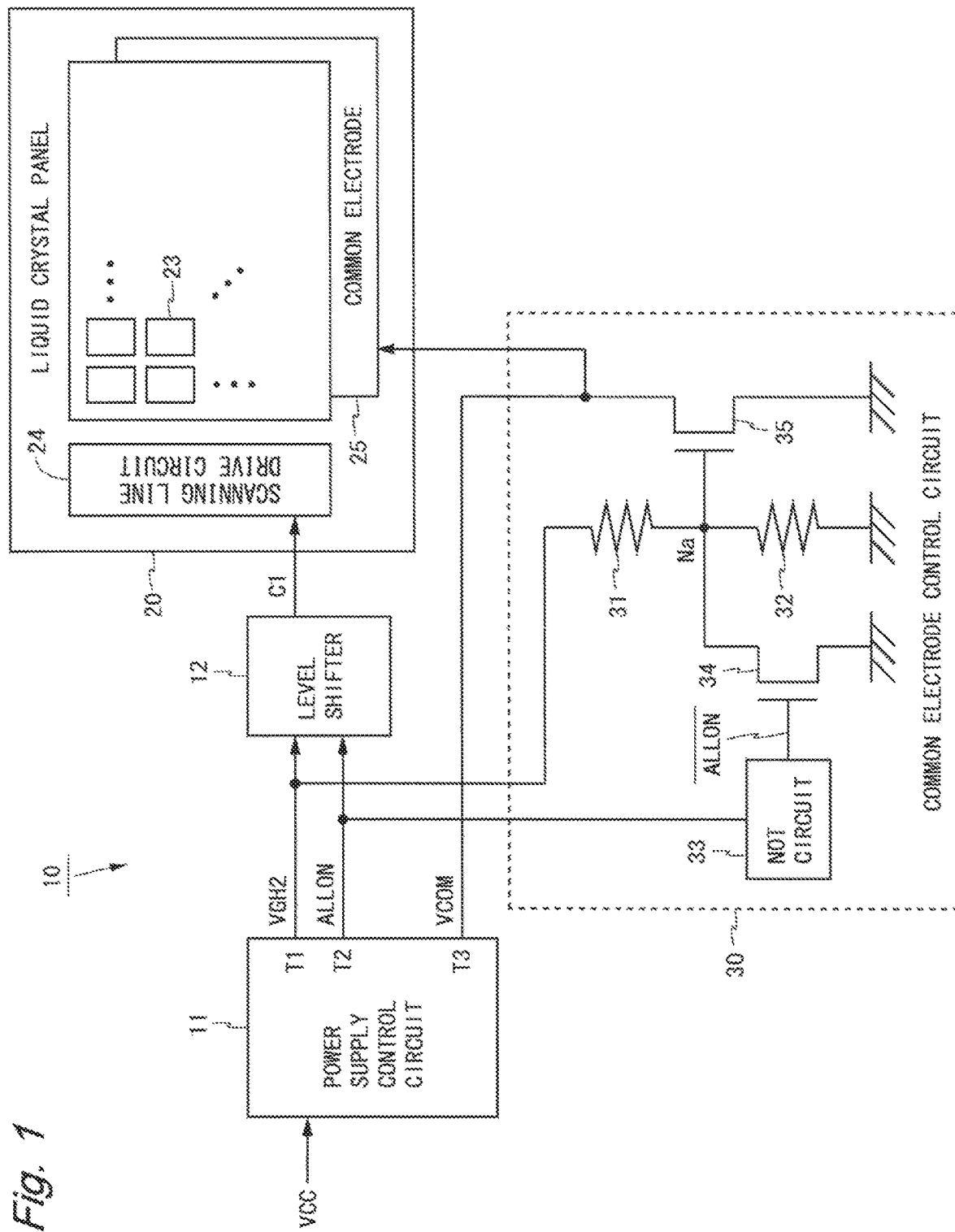
FIG. 1 is a block diagram showing a configuration of a liquid crystal display device according to an embodiment.

FIG. 1 is a block diagram showing a configuration of a liquid crystal display device according to an embodiment. A liquid crystal display device 10 shown in FIG. 1 includes a power supply control circuit 11, a level shifter 12, a liquid crystal panel 20, and a common electrode control circuit 30. Typically, different IC chips are used for the power supply control circuit 11 and the level shifter 12. Hereinafter, a field effect transistor is referred to as an FET.

A power supply voltage VCC is externally supplied to the liquid crystal display device 10. In the following, the power supply voltage VCC is assumed to be a voltage of 3.3 V. Based on the power supply voltage VCC, the power supply control circuit 11 outputs various control signals and power supply voltages required for an operation of the liquid crystal display device 10. Specifically, the power supply control circuit 11 outputs a gate high voltage VGH2, an all-on control signal ALLON, a common electrode voltage VCOM, and the like. Hereinafter, an output terminal of the gate high voltage VGH2 is referred to as T1, an output terminal of the all-on control signal ALLON is referred to as T2, and an output terminal of the common electrode voltage VCOM is referred to as T3.

Figure 2:
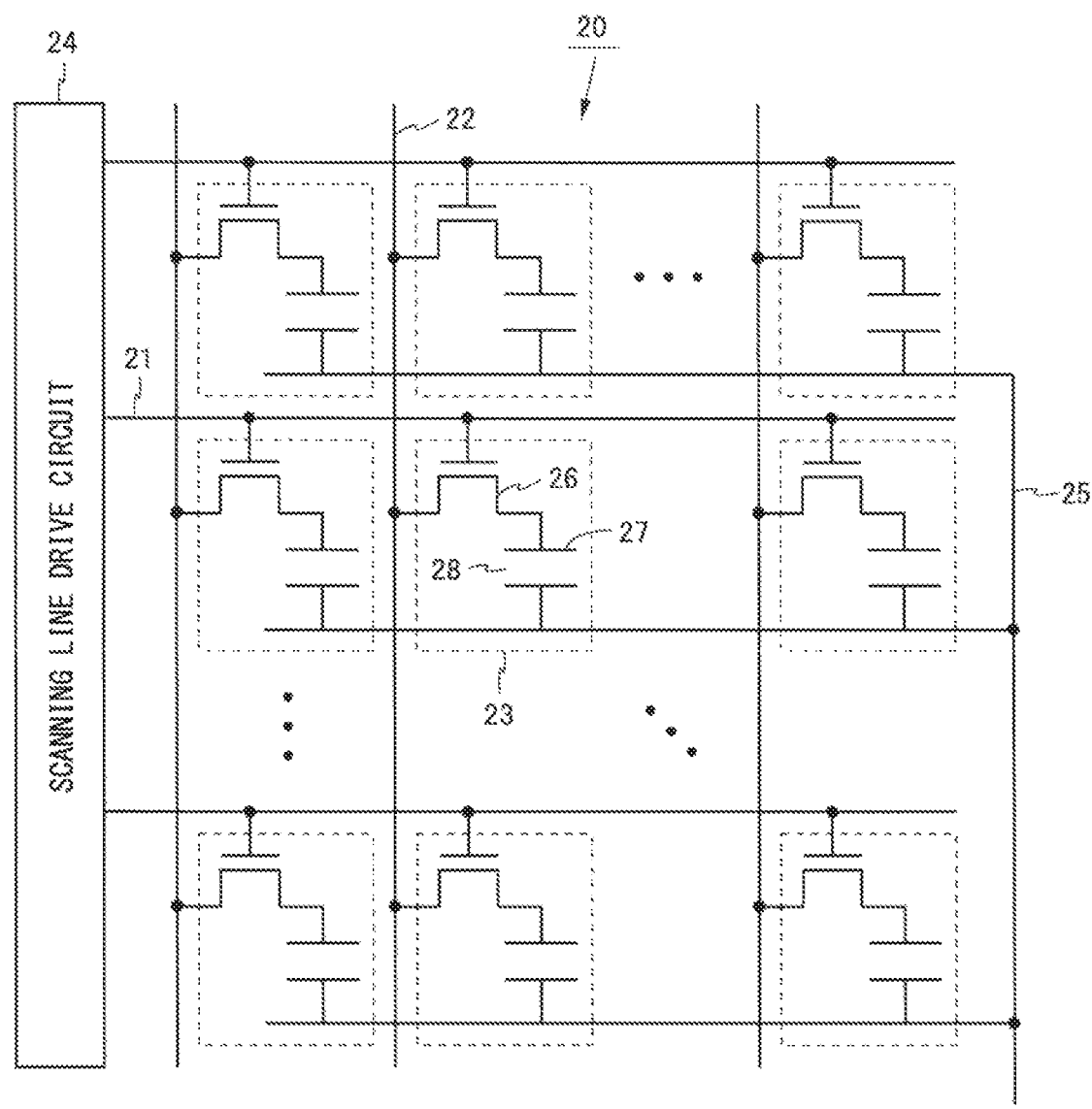
FIG. 2 is a diagram showing details of a liquid crystal panel of the liquid crystal display device shown in FIG. 1.

FIG. 2 is a diagram showing details of the liquid crystal panel 20. As shown in FIG. 2, the liquid crystal panel 20 includes scanning lines 21, data lines 22, pixel circuits 23, a scanning line drive circuit 24, and a common electrode 25. The scanning lines 21 are arranged in parallel with each other. The data lines 22 are arranged in parallel with each other so as to intersect with the scanning lines 21 perpendicularly. The pixel circuits 23 are arranged two-dimensionally corresponding to intersections of the scanning lines 21 and the data lines 22. The pixel circuit 23 includes a TFT 26 and a pixel electrode 27. The common electrode 25 is disposed so as to oppose to all of the pixel electrodes 27 included in the liquid crystal panel 20. A liquid crystal capacitor 28 is formed in the pixel circuit 23 by providing a liquid crystal layer (not shown) between the pixel electrode 27 and the common electrode 25.

The scanning line drive circuit 24 is formed on the liquid crystal panel 20 using TFTs together with the pixel circuits 23 (monolithic gate driver). The level shifter 12 outputs a drive signal C1 to the scanning line drive circuit 24 formed on the liquid crystal panel 20, based on the gate high voltage VGH2, the all-on control signal ALLON, and the like. The scanning line drive circuit 24 drives the scanning lines 21 based on the drive signal C1. The data lines 22 are driven by a data line drive circuit (not shown). The common electrode voltage VCOM which is output from the power supply control circuit 11 is applied to the common electrode 25.

The TFT 26 included in the pixel circuit 23 and TFTs (not shown) included in the scanning line drive circuit 24 are formed using a same material by a same manufacturing process. These TFTs are oxide semiconductor TFTs each having an oxide semiconductor layer formed using oxide semiconductor. In this manner, the liquid crystal panel 20 is formed using oxide semiconductor. The oxide semiconductor TFTs will be described later.

The common electrode control circuit 30 includes two resistors 31, 32, a NOT circuit 33, and two FETs 34, 35. The FETs 34, 35 are N-channel type transistors. The resistors 31, 32 are connected in series. One end (upper end in FIG. 1) of the resistor 31 is connected to the terminal T1 of the power supply control circuit 11, and the gate high voltage VGH2 is applied to the one end of the resistor 31. Another end of the resistor 31 is connected to one end of the resistor 32. Another end of the resistor 32 is grounded. Hereinafter, a node to which a connecting point of the resistors 31, 32 is connected is referred to as Na.

An input terminal of the NOT circuit 33 is connected to the terminal T2 of the power supply control circuit 11, and the all-on control signal ALLON is supplied to the input terminal of the NOT circuit 33. Based on the all-on control signal ALLON, the NOT circuit 33 outputs an inverted signal (hereinafter referred to as a signal XALLON in the description) of the all-on control signal ALLON.

A drain terminal of the FET 34 and a gate terminal of the FET 35 are connected to the node Na. A gate terminal of the FET 34 is connected to an output terminal of the NOT circuit 33, and the signal XALLON is supplied to the gate terminal of the FET 34. Source terminals of the FETs 34, 35 are grounded. A drain terminal of the FET 35 is connected to the common electrode 25. More specifically, the drain terminal of the FET 35 is connected to a wiring which connects the terminal T3 of the power supply control circuit 11 and the common electrode 25.

When the all-on control signal ALLON is called a control signal, the gate high voltage VGH2 is called a power supply voltage, and the node Na is called a first node, the common electrode control circuit 30 includes a first resistor (resistor 31) having one end to which the power supply voltage is supplied and another end connected to the first node, a second resistor (resistor 32) having one end connected to the first node and another end connected to a ground, the NOT circuit 33 for outputting the inverted signal of the control signal, a first transistor (FET 34) having a first conduction terminal (drain terminal) connected to the first node, a second conduction terminal (source terminal) connected to the ground, and a control terminal (gate terminal) to which the inverted signal is supplied, and a second transistor (FET 35) having a first conduction terminal connected to the common electrode 25, a second conduction terminal connected to the ground, and a control terminal connected to the first node. As shown below, the common electrode control circuit 30 connects the common electrode 25 to the ground when the control signal is at an active level and the power supply voltage is at an operation level.

In the liquid crystal display device 10, a charge pull-out period for pulling out charge remaining in the liquid crystal panel 20 is set after power off. The gate high voltage VGH2 is a high-level voltage supplied from the power supply control circuit 11 to the scanning line drive circuit 24 on the liquid crystal panel 20. The gate high voltage VGH2 is kept at a previous high level (hereinafter, referred to as an operation level) even after power off until a middle of the charge pull-out period.

Figure 3:
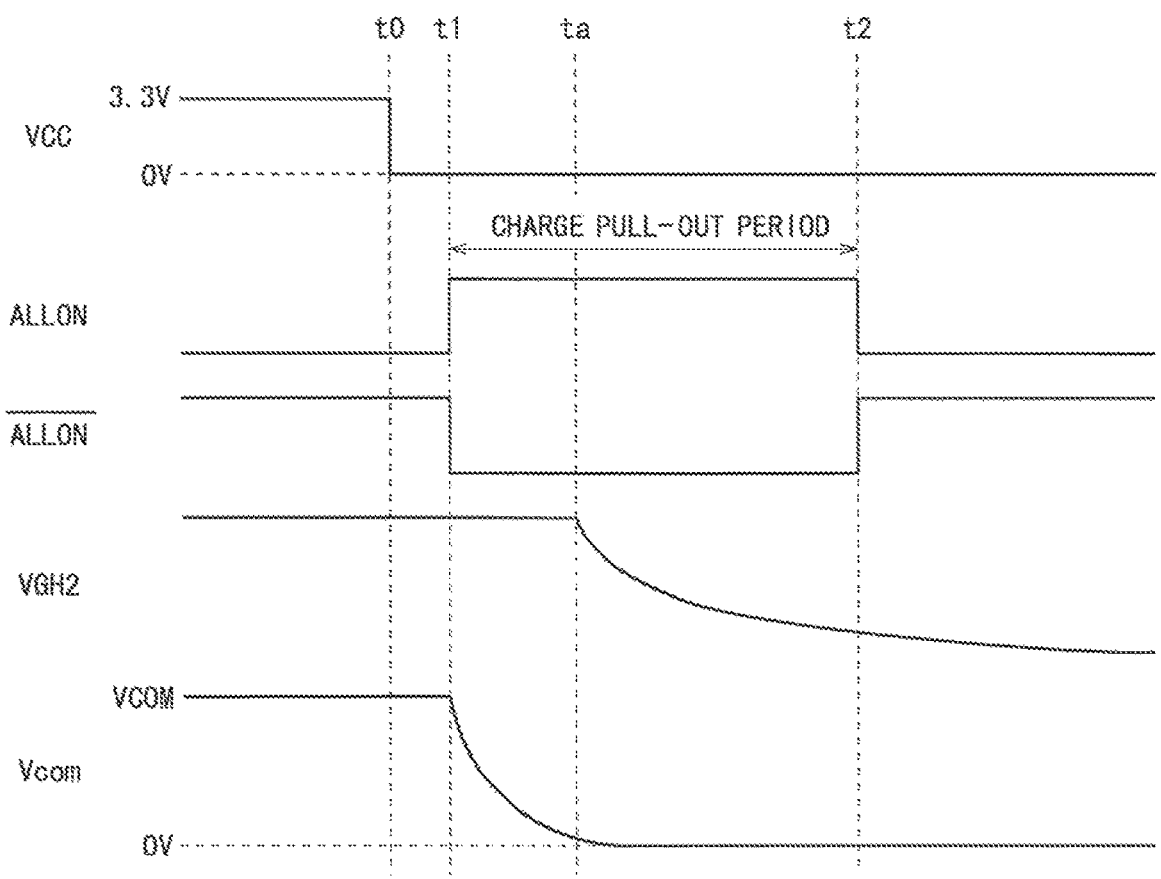
FIG. 3 is a signal waveform diagram of the liquid crystal display device shown in FIG. 1 when power off.
Figure 4:
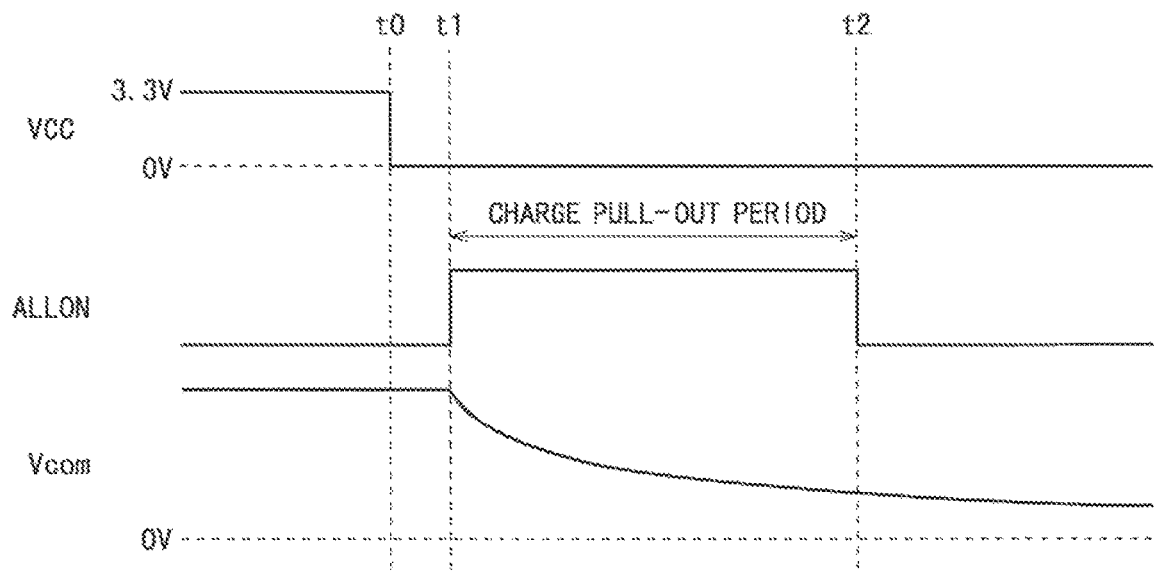
FIG. 4 is a signal waveform diagram of a conventional liquid crystal display device when power off.
Figure 5:
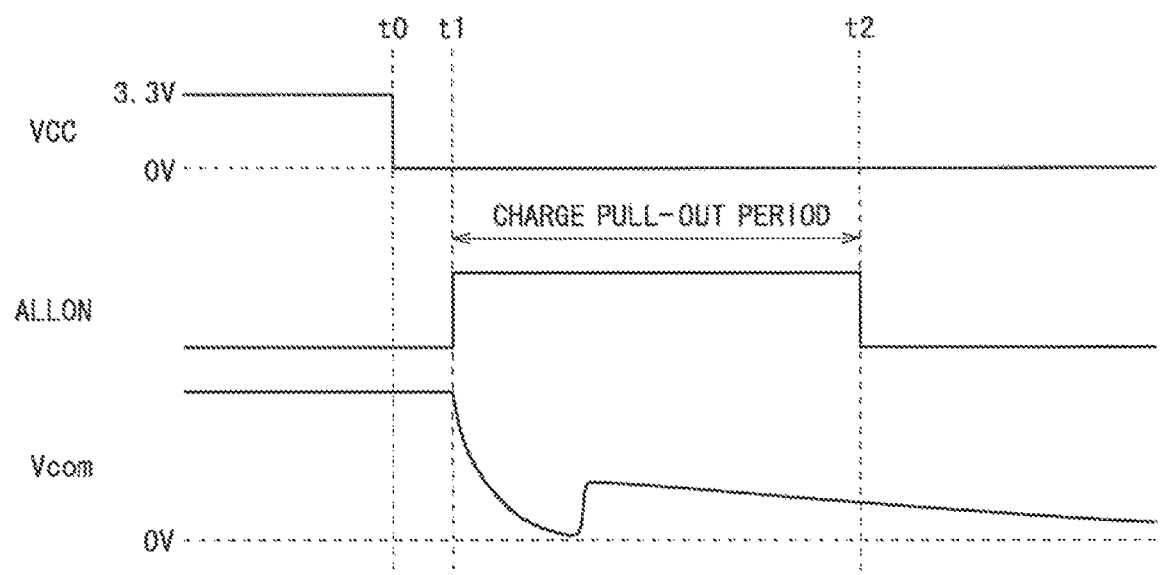
FIG. 5 is a signal waveform diagram of a conventional liquid crystal display device when power off.

FIG. 3 is a signal waveform diagram of the liquid crystal display device 10 when power off. In FIG. 3, at time t0, the power supply voltage VCC changes from 3.3 V to a ground level. The charge pull-out period is set at time t1 to t2 after power off. The all-on control signal ALLON becomes a high level in the charge pull-out period, and becomes a low level otherwise. The gate high voltage VGH2 is kept at the operation level (high level) even after power off until the middle of the charge pull-out period. Hereinafter, a time at which the gate high voltage VGH2 starts lowering is referred to as ta. Furthermore, a voltage of the common electrode 25 is referred to as Vcom, distinguishing from the common electrode voltage VCOM which is output from the power supply control circuit 11.

Before the time t1, the gate high voltage VGH2 is at the operation level, the all-on control signal ALLON is at the low level, and the signal XALLON is at the high level. Thus, the FET 34 becomes an ON state, a voltage of the node Na becomes the ground level, and the FET 35 becomes an OFF state. Before the time t1, the common electrode voltage VCOM which is output from the power supply control circuit 11 is applied to the common electrode 25. Therefore, the voltage Vcom of the common electrode 25 is equal to the common electrode voltage VCOM which is output from the power supply control circuit 11.

At the time t1, the all-on control signal ALLON changes to the high level. Accordingly, the signal XALLON changes to the low level, and the FET 34 becomes the OFF state. A voltage Va of the node Na in the charge pull-out period is given by a following equation (1). In the equation (1), R1, R2 respectively represent resistance values of the resistors 31, 32.

$$Va = \{R2/(R1+R2)\} \times VGH2 \quad (1)$$

The resistance values of the resistors 31, 32 are determined so that the FET 35 becomes the ON state at the time t1. Therefore, at the time t1, the FET 35 becomes the ON state, and the terminal T3 of the power supply control circuit 11 and the common electrode 25 are connected to the ground. This state continues at least by the time ta.

After the time ta, the gate high voltage VGH2 is lowered. When the resistance values of the resistors 31, 32 are determined as described above, the FET 35 keeps the ON state even after the time ta until the gate high voltage VGH2 is lowered to some extent. Therefore, even after the time ta, while the FET 35 is in the ON state, the terminal T3 of the power supply control circuit 11 and the common electrode 25 are connected to the ground as before.

In this manner, after the time t1, while the FET 35 is in the ON state, the common electrode 25 is connected to the ground. Thus, charge remaining in the common electrode 25 at the time t1 is discharged through the FET 35, and charge remaining in the pixel electrode 27 is also discharged accordingly. Therefore, the voltage Vcom of the common electrode 25 is lowered rapidly after the start of the charge pull-out period and reaches the ground level in a short time. The voltage Vcom of the common electrode 25 reaches the ground level at latest by the time t2 when the charge pull-out period finishes.

As described above, the liquid crystal display device 10 includes the liquid crystal panel 20 having the common electrode 25 and formed using oxide semiconductor, the power supply control circuit 11 for outputting a control signal (all-on control signal ALLON) which becomes the active level (high level) in a period (charge pull-out period) set after power off, and a power supply voltage (gate high voltage VGH2) which is kept at the operation level (high level) even after power off until a middle of the period, and the common electrode control circuit 30 for connecting the common electrode 25 to the ground when the control signal is at the active level and the power supply voltage is at the operation level.

The liquid crystal panel 20 has the scanning lines 21, and the control signal is the all-on control signal ALLON for selecting all of the scanning lines 21. The scanning line drive circuit 24 for driving the scanning lines 21 is formed on the liquid crystal panel 20, and the power supply voltage is a high-level voltage (gate high voltage VGH2) which is output to the scanning line drive circuit 24. The above period is the charge pull-out period, and the all-on control signal ALLON becomes the high level in the charge pull-out period.

Therefore, in the liquid crystal display device 10, in a part of the period (charge pull-out period) set after power off, the control signal becomes the active level, the power supply voltage becomes the operation level, and the common electrode 25 is connected to the ground. Therefore, the voltage Vcom of the common electrode 25 is lowered rapidly after the start of the period and reaches the ground level in a short time. Thus, according to the liquid crystal display device 10, it is possible to prevent charge from remaining in the liquid crystal panel 20 after power off and to prevent burn-in after power on.

In the following, the oxide semiconductor TFT will be described. The oxide semiconductor included in the oxide semiconductor layer of the oxide semiconductor TFT may be an amorphous oxide semiconductor or a crystalline oxide semiconductor having a crystalline portion. As the crystalline oxide semiconductor, a polycrystalline oxide semiconductor, a microcrystalline oxide semiconductor, and a crystalline oxide semiconductor in which a c-axis is aligned so as to be substantially perpendicular to a layer surface, and the like can be mentioned. The oxide semiconductor layer may have a layered structure including two or more layers. When the oxide semiconductor layer has the layered structure, the oxide semiconductor layer may include an amorphous oxide semiconductor layer and a crystalline oxide semiconductor layer. Alternatively, a plurality of crystalline oxide semiconductor layers having different crystal structures may be included. Or, a plurality of amorphous oxide semiconductor layers may be included. When the oxide semiconductor layer has a two-layered structure including an upper layer and a lower layer, an energy gap of the oxide semiconductor included in the upper layer is preferably larger than an energy gap of the oxide semiconductor included in the lower layer. However, when a difference in the energy gaps between these layers is relatively small, the energy gap of the oxide semiconductor in the lower layer may be larger than the energy gap of the oxide semiconductor in the upper layer.

A material, a structure, and a film forming method of the amorphous oxide semiconductor and each of the above-described crystalline oxide semiconductors, a structure of the oxide semiconductor layer having a layered structure, and the like are described, for example, in Japanese Laid-Open Patent Publication No. 2014-7399. For reference, all the disclosure contents of Japanese Laid-Open Patent Publication No. 2014-7399 is incorporated herein by reference.

The oxide semiconductor layer may include, for example, at least one kind of metal elements selected from In (indium), Ga (gallium), and Zn (zinc). The oxide semiconductor layer includes, for example, an In—Ga—Zn—O based semiconductor (for example, indium gallium zinc oxide). The In—Ga—Zn—O based semiconductor is a ternary oxide of In, Ga, and Zn, and a ratio (composition ratio) of In, Ga, and Zn is not especially limited, and may be, for example, In:Ga:Zn=2:2:1, In:Ga:Zn=1:1:1, In:Ga:Zn=1:1:2, and the like. Such an oxide semiconductor layer can be formed using an oxide semiconductor film including In—Ga—Zn—O based semiconductor. The In—Ga—Zn—O based semiconductor may be amorphous or crystalline. As the crystalline In—Ga—Zn—O based semiconductor, the crystalline In—Ga—Zn—O based semiconductor in which the c-axis is aligned so as to be substantially perpendicular to the layer surface is preferable.

A crystal structure of the crystalline In—Ga—Zn—O based semiconductor is described, for example, in the above-described Japanese Laid-Open Patent Publication No. 2014-7399, Japanese Laid-Open Patent Publication No. 2012-134475, Japanese Laid-Open Patent Publication No. 2014-209727, and the like. For reference, all of the disclosure contents of Japanese Laid-Open Patent Publication No. 2012-134475 and Japanese Laid-Open Patent Publication No. 2014-209727 are incorporated herein by reference. Since a TFT having the In—Ga—Zn—O based semiconductor layer has a high mobility (more than 20 times when compared with the amorphous silicon TFT) and a small leakage current (less than 1/100 compared when compared with the amorphous silicon TFT), it can be suitably used as drive TFTs (for example, TFTs included in a drive circuit provided on a same substrate as a display area, in a surrounding portion of the display area including pixels) and pixel TFTs (TFTs provided in the pixel).

The oxide semiconductor layer may include other oxide semiconductor in place of the In—Ga—Zn—O based semiconductor. For example, an In—Sn—Zn—O based semiconductor (for example, $In_2O_3$—$SnO_2$—ZnO; InSnZnO) may be included. The In—Sn—Zn—O based semiconductor is a ternary oxide of In, Sn (tin), and Zn. Alternatively, the oxide semiconductor layer may include an In—Al—Zn—O based semiconductor, an In—Al—Sn—Zn—O based semiconductor, a Zn—O based semiconductor, an In—Zn—O based semiconductor, a Zn—Ti—O based semiconductor, a Cd—Ge—O based semiconductor, a Cd—Pb—O based semiconductor, a CdO (cadmium oxide), an Mg—Zn—O based semiconductor, an In—Ga—Sn—O based semiconductor, an In—Ga—O based semiconductor, a Zr—In—Zn—O based semiconductor, a Hf—In—Zn—O based semiconductor, and the like.

By providing the common electrode control circuit 30 to the liquid crystal display device including the liquid crystal panel formed using the oxide semiconductor TFTs, such as the IGZO-TFTs, it is possible to lower the common electrode voltage to the ground level after power off and to prevent burn-in after power on.

Note that although the power supply voltage VCC is assumed to be 3.3 V in the above description, the power supply voltage VCC may be equal to or more than 5 V. In this case, the effect that the burn-in after power on can be prevented becomes more apparent.

This application claims a priority based on Japanese Patent Application No. 2017-118260 filed on Jun. 16, 2017, and entitled "Liquid Crystal Display Device And Drive Method Therefor", which is incorporated herein by reference in its entirety.

DESCRIPTION OF REFERENCE CHARACTERS

10: LIQUID CRYSTAL DISPLAY DEVICE
11: POWER SUPPLY CONTROL CIRCUIT
12: LEVEL SHIFTER
20: LIQUID CRYSTAL PANEL
23: PIXEL CIRCUIT
24: SCANNING LINE DRIVE CIRCUIT
25: COMMON ELECTRODE
30: COMMON ELECTRODE CONTROL CIRCUIT
31, 32: RESISTOR
33: NOT CIRCUIT
34, 35: FET

The invention claimed is:

1. A liquid crystal display device comprising:
a liquid crystal panel having a common electrode and formed using oxide semiconductor;
a power supply control circuit configured to output a control signal which becomes an active level in a period set after power off, and a power supply voltage which is kept at an operation level even after power off until a middle of the period; and
a common electrode control circuit configured to connect the common electrode to a ground when the control signal is at the active level and the power supply voltage is at the operation level, wherein
the common electrode control circuit includes:
a first resistor having one end to which the power supply voltage is supplied and another end connected to a first node;
a second resister having one end connected to the first node and another end connected to the ground;
a NOT circuit configured to output an inverted signal of the control signal;
a first transistor having a first conduction terminal connected to the first node, a second conduction terminal connected to the ground, and a control terminal to which the inverted signal is supplied; and
a second transistor having a first conduction terminal connected to the common electrode, a second conduction terminal connected to the ground, and a control terminal connected to the first node.

2. The liquid crystal display device according to claim 1, wherein
the liquid crystal panel has scanning lines, and
the control signal is an all-on control signal for selecting all of the scanning lines.

3. The liquid crystal display device according to claim 2, wherein
a scanning line drive circuit configured to drive the scanning lines is formed on the liquid crystal panel, and
the power supply voltage is a high-level voltage which is output to the scanning line drive circuit.

4. The liquid crystal display device according to claim 2, wherein the power supply voltage is equal to or more than 5 V.

5. The liquid crystal display device according to claim 2, wherein
the period is a charge pull-out period, and the all-on control signal becomes a high level in the charge pull-out period.

* * * * *